United States Patent [19]

Sjostrand

[11] 4,054,626

[45] Oct. 18, 1977

[54] METHOD FOR FORMING BODIES OF FOAMED PLASTISOL RESIN

[76] Inventor: Gerald D. Sjostrand, 4734 E. Home, Fresno, Calif. 93703

[21] Appl. No.: 673,299

[22] Filed: Apr. 2, 1976

[51] Int. Cl.$^2$ .............................................. B29D 27/00
[52] U.S. Cl. ...................................... 264/45.4; 264/55; 264/46.4; 264/46.7; 264/140; 264/259; 264/DIG. 69; 428/306; 428/312; 428/327
[58] Field of Search ................. 264/51, 54, 46.4, 46.7, 264/140, 259, DIG. 69, 45.5, 55; 428/306, 312, 329

[56] References Cited

U.S. PATENT DOCUMENTS

| 3,192,294 | 6/1965 | Streed et al. .......................... 264/54 |
| 3,272,683 | 9/1966 | Marcus et al. ...................... 264/51 X |
| 3,376,366 | 4/1968 | Clark ...................................... 264/51 |
| 3,872,200 | 3/1975 | Tokito et al. .......................... 264/54 |
| 3,904,720 | 9/1975 | Sjostrand ............................ 264/45.5 |

*Primary Examiner*—Philip Anderson
*Attorney, Agent, or Firm*—Huebner & Worrel

[57] ABSTRACT

An improved method for forming bodies of foamed plastisol resin characterized by the steps of solidifying a flowable plastisol containing a chemical blowing agent to form a solidified body, grinding the body to form a body of uniformly sized aggregate, depositing the aggregate in a mold, and heating the mold to a temperature above that at which the plastisol fuses and the blowing agent decomposes.

8 Claims, No Drawings

METHOD FOR FORMING BODIES OF FOAMED PLASTISOL RESIN

BACKGROUND OF THE INVENTION

1. Field of the Invention

The invention relates to a method for forming bodies of foamed plastisol resin, and more particularly to an improved method for forming bodies of foamed plastisol within closed molds.

2. Description of the Prior Art

The prior art, of course, is replete with various formulations for plastisol as well as various formulations for chemically blown plastisols.

A typical formulation, in parts by weight, for chemically blown plastisol is as follows:

| CHEMICALLY BLOWN FOAMS (Basically Closed Cell Structure) | | | | |
|---|---|---|---|---|
| | Soft Foam | Filled Soft Foam | Hard Foam | Filled Hard Foam |
| PVC emulsion plastisol resin homopolymer[a] | 70 | 70 | 70 | 70 |
| Extender resin[b] | 30 | 30 | 30 | 30 |
| DOP | 20 | 80 | 50 | 50 |
| BBP | 70 | 10 | 10 | 10 |
| Epoxy plasticizer | 5 | 5 | 5 | 5 |
| Blowing paste azodicarbonamide | 6 | 6 | 6 | 5 |
| Zinc blowing catalyst | 3 | — | — | — |
| Dibasic lead phosphite | — | — | 6 | 5 |
| Ba-Cd-Zn stabilizer | — | 3 | — | — |
| $CaCO_3$ | — | 20–25 | — | 20–25 |
| Surfactant | 1.5 | — | — | 2 |
| Approximate foam density lb/cu ft | 19 | 21.5 | 20 | 22.5 |
| Blowing temperature | 360° F. | 360° F. | 360° F. | 365° F. |

[a]Diamond PVC-7602, inherent viscosity 0.90.
[b]Diamond PVC 7-44, inherent viscosity 0.83.

One of the most commonly used chemical blowing agents is azodicarbonamide, which tends to produce foam with a high closed-cell content. Through a proper selection of a heat stabilizer-activator, the temperature at which cellular expansion will occur can be adjusted with suitable accuracy. Hence, a formulation can be chosen which will yield the desired cellular structure and foam density. For example, given a plastisol having a fusion temperature of 320° F. a blow agent which decomposes at approximately 360° F. produces a blown plastisol having a foam density suitable for many practical uses. Since formulations and temperatures are variable, and can be established emperically, a more detailed discussion of the formulations for plastisols is omitted in the interest of brevity.

One technique for forming bodies of foamed plastisol is more fully described in U.S. Pat. No. 3,904,720 to Gerald D. Sjostrand. This method includes the steps of dipping a heated mandrel in a liquid bath of plastisols, including a blowing agent, for thus forming a gelled body on the surface of the mandrel, and thereafter immersing the mandrel in a liquid bath maintained at a temperature at which the blowing agent decomposes. While this method serves quite satisfactorily for its intended purpose, it is not readily adaptable for use in producing bodies requiring a closed mold in the production thereof.

It has been suggested that foamed articles can be produced employing a closed mold cavity. For example, U.S. Pat. No. 3,432,581, to Jacob J. Rosen, discloses a method for producing foamed articles from foamable plastic compositions, specifically a foamable polyvinyl chloride plastisol, wherein the final product is formed of a continuous foam structure, including a cellular inner portion and a substantially smooth outer skin. The preferred technique therein disclosed includes the steps of mixing and aerating a plastic composition, distributing a gelled layer of plastic composition on the surface of the mold cavity by rotating the mold, while heating, and subsequently fusing and foaming the plastisol.

It is important to note that the patent discloses a technique wherein a flowable plastisol is placed in a mold cavity, the mold cavity closed, with the mold haves being joined together, and thereafter the mold is rotated about a plurality of axes, while heating, in order to distribute the plastisol throughout the mold cavity, to form a gel layer on the cavity walls.

This technique suffers from several obvious disadvantages and cannot readily be employed by operators lacking suitable equipment. For example, the filled and closed mold must be rotated in various directions, while being heated, in order to assure that a layer of gelled plastisol is formed on the internal surface of the mold cavity, before foaming is initiated.

Moreover, as should be apparent, the heating of a mold at its external surfaces causes plastisol contained therein to gel and then foam inwardly. Inward foaming tends to cause a layer of foamed material to be established about the inner core of the mold cavity. This thin layer acts as a thermal barrier and prevents the cavity from being uniformly heated. This tends to result in a product of a non-uniform density. Consequently, the resulting product lacks uniformity in size and configuration.

Finally, when employing this technique for forming bodies of foamed plastisol, the flowable plastisol, under the influence of gravity, tends to seek its lowest level so that the position of the mold, prior to gelling, becomes critical.

Consequently, it should be apparent that a need exists for a practical, and improved method for forming bodies of foamed plastisol utilizing a closed mold cavity.

Accordingly, it is the purpose of the instant invention to provide a simple, practical, and economic method for forming bodies of foamed plastisol resin utilizing a closed mold cavity, whereby the difficulties and disadvantages of attending the methods as taught by the prior art are avoided.

OBJECTS AND SUMMARY OF THE INVENTION

It is therefore an object of the instant invention to provide an improved method for forming bodies of foamed plastisol which overcomes the aforementioned difficulties and disadvantages.

Another object is to provide an improved method for forming bodies of foamed plastisol resin employing a closed mold.

It is another object to provide an improved method for forming bodies of foamed plastisol resin characterized by a substantially uniform density and configuration.

It is another object to provide an improved method for forming bodies of foamed plastisol resin utilizing a closed mold, the initial position and the motion of which is not critical in producing products of uniform density and configuration.

It is another object to provide in a method for forming bodies of foamed plastisol resin, the steps of solidifying a flowable plastisol containing a chemical blowing agent, thus to form a solidified body of plastisol, grinding the solidified body, depositing the resulting particles within a mold cavity, and thereafter heating the mold cavity to a temperature above that at which the blowing agent decomposes.

Another object is to provide a method for forming bodies of foamed plastisol resin which is particularly useful in connection with forming utilitarian products, although not necessarily restricted in use thereto, since the method may be similarly useful when forming products having a slick finish for aesthetic purposes such as dolls and the like.

These and other objects and advantages are achieved by heating a fluid, foamable plastisol, thus to form a solidified body of plastisol, grinding the solidified body to form aggregate of a substantially uniform size, depositing the aggregate in a selected mold cavity, closing the mold cavity, and thereafter heating the mold cavity to a selected temperature, for thus heating the aggregate uniformly throughout the mold cavity whereby foamed bodies characterized by uniformity are produced, as will hereinafter become more readily apparent by reference to the following description and claims.

DESCRIPTION OF THE PREFERRED EMBODIMENT

As will be appreciated by those familiar with the art of molding plastics, the method which embodies the principles of the instant invention readily can be performed utilizing simple and universally available equipment. Therefore, a detailed discussion of the equipment employable is omitted in the interest of brevity.

The method is characterized by the initial step of solidifying a selected flowable or fluid plastisol. For example, a batch of foamable plastisol in its fluid state may be deposited as a thin layer on a large surface and then heated to temperatures sufficient for causing the plastisol to gel and thus form a solidified body. For example, when using plastisol resin of the type hereinbefore mentioned, gelling normally occurs at approximately 150°.

Once the plastisol has gelled, but while it is in a non-foamed state, the resulting solidified body is subjected to a grinding operation for thereby reducing the body to aggregate, capable of being passed through a screen of a predetermined size, typified by a ¼ inch mesh. The plastisol aggregate then is deposited in an open mold cavity, supported in any suitable disposition. The quantity of plastisol aggregate deposited in the cavity is determined empirically in order to produce a foamed plastisol body having a desired density.

Upon being closed the mold is subjected to a selected temperature sufficient for causing the plastisol aggregate to fuse. Heating of the mold to a preselected temperature at which decomposition of the blowing agent is achieved is continued for an empirically determined duration whereupon the plastisol is caused to foam for thus substantially filling the cavity. The mold is then cooled to room temperature and opened.

In practice, it is necessary to vent the mold cavity, through incorporation of minute bores extended between the cavity to ambient atmosphere, in order to accommodate discharge from the cavity of entrapped air and gas generated by the decomposition of the blowing agent. As the plastisol is foamed as filling the mold cavity occurs, a limited quantity of the plastisol is extruded from the bores. As a practical matter, completion of the foaming operation is signaled by extrusion of the plastisol through bores located at preselected positions.

In practice, the method hereinbefore described provides products of substantially uniform density and configuration. While it is not fully understood precisely why the method so successfully produces products of uniform density, it is postulated that the air entrapped in the interstices defined by the plastisol aggregate expands inwardly and thus is caused to circulate. As a direct result of the thus induced circulation of heated air, the aggregate throughout the cavity is heated substantially uniformly. Thus, the plastisol tends to fuse and foam uniformly throughout the mold cavity, rather than inwardly, resulting in the production of bodies characterized by a high degree of uniformity.

In practice, it often is desirable to provide the aggregate by grinding scrap material resulting from previously performed foaming and molding operations. Therefore, fused plastisol which has not been foamed, or even plastisol which has been partially foamed, may be used to fill molds. In any event, it is necessary for the plastisol to possess a capability for foaming as well as to be characterized by a solid state so that it may be ground prior to being introduced into the mold cavity.

Hence, it is to be understood that the method herein described is not limited to a use of plastisol provided by gelling alone, but may, instead, be practiced utilizing plastisol which is fused or even fused and partially foamed.

Moreover, where it is desirable to reinforce a body of foamed plastisol formed within a mold cavity, a material having suitable strength is provided as a liner for the mold. For example, the mold cavity can be lined utilizing burlap. The plastisol resin is caused to pass through the mesh thereof, during fusing and thus is caused to capture the burlap. Similarly, it is possible to utilize woven fibers having surfaces pretreated with vinyl for thus rendering the material susceptible to bonding with the plastisol.

Additionally, it has been found practical to line the cavity with a malleable material, such as mesh wire and the like, so that the plastisol is bonded thereto for thus imparting a determinable rigidity to the resulting product or body formed within the mold. Of course, the particular rigidity of the material introduced into the mold can be varied as desired. For example, where a high degree of rigidity is desired, an aluminum plate is introduced into the mold so that the plastisol can be pressure-bonded thereto as foaming occurs.

In view of the foregoing, it should readily be apparent that the method which embodies the principles of the instant invention provides a practical solution to the problem of molding plastisol resins in closed mold cavities.

Although the invention has been shown and described in what is conceived to be the most practical and preferred method, it is recognized that departures may be made therefrom within the scope of the invention, which is not to be limited to the illustrative details disclosed.

Having described my invention, what I claim as new and desire to secure by Letters Patent is:

1. An improved method for forming a unitary body of foamed plastiscol resin comprising the steps of:
   A. heating a fluid plastisol containing a chemical blowing agent to form a solidified body;
   B. grinding the solidified body to form aggregate;

C. depositing the aggregate in a mold cavity for a closed mold; and

D. heating the aggregate within said mold cavity to a temperature above the temperature at which said blowing agent decomposes for thus causing the plastisol aggregate to expand and fuse into a unitary foamed body of substantially uniform density.

2. The method of claim 1 wherein the step of heating a fluid plastisol includes the step of heating said fluid plastisol to a gelling temperature.

3. The method of claim 1 wherein the step of heating a fluid plastisol includes the step of heating said plastisol to a fusing temperature.

4. The method of claim 1 wherein the step of heating a fluid plastisol includes the step of heating said plastisol to a temperature at which the blowing agent starts to decompose.

5. The method of claim 1 wherein the step of grinding said solidified body of plastisol includes the step of grinding the body to form aggregate which passes through a screen having a mesh of ⅛ inch dimension.

6. The method of claim 1 wherein the step of depositing the aggregate in the mold includes the step of forming a body of aggregate having air-filled interstices.

7. The method of claim 1 further comprising the step of inserting within the mold cavity a support member for supporting and bonding to the resulting foamed body.

8. In an improved method for foaming a unitary body of foamed plastisol resin the steps comprising:

A. heating fluid plastisol containing a chemical blowing agent to a temperature at which decomposition of the blowing agent is initiated for thus forming a solidified body consisting essentially of plastisol in its partially blown or expanded state;

B. grinding the solidified body to form an aggregate;

C. forming in a mold cavity of a closed mold a body of aggregate having air-filled interstices; and D. heating the body of aggregate within said cavity to a temperature at which te plastisol fuses and the blowing agent further decomposes for thus causing the aggregate to expand and fuse into a body of blown plastisol having a substantially uniform density.

* * * * *